(12) United States Patent
Oda

(10) Patent No.: US 6,621,903 B2
(45) Date of Patent: Sep. 16, 2003

(54) PORTABLE TELEPHONE SET AND METHOD FOR INPUTTING SAID INCOMING CALL REPORTING MELODY

(75) Inventor: Toshiaki Oda, Tokyo (JP)

(73) Assignee: NEC Corporation, Tokyo (JP)

( * ) Notice: Subject to any disclaimer, the term of this patent is extended or adjusted under 35 U.S.C. 154(b) by 169 days.

(21) Appl. No.: 09/811,533

(22) Filed: Mar. 20, 2001

(65) Prior Publication Data

US 2001/0024490 A1 Sep. 27, 2001

(30) Foreign Application Priority Data

Mar. 21, 2000 (JP) ........................................ 2000-077521

(51) Int. Cl.⁷ .............................................. H04M 3/02
(52) U.S. Cl. .............................. 379/374.01; 379/88.01; 379/373.04; 455/567
(58) Field of Search ........................... 379/88.01, 88.04, 379/88.07, 88.11, 373.03, 373.04, 374.01, 374.02; 704/270, 272, 276, 277, 278; 84/600, 602; 455/412, 418, 458, 566, 567, 563

(56) References Cited

U.S. PATENT DOCUMENTS

| | | | | |
|---|---|---|---|---|
| 4,215,343 A | * | 7/1980 | Ejiri et al. | 345/27 |
| 4,519,044 A | * | 5/1985 | Munetsugu | 708/134 |
| 4,646,609 A | * | 3/1987 | Teruo et al. | 84/615 |
| 5,307,059 A | * | 4/1994 | Connary et al. | 340/7.62 |
| 5,504,269 A | * | 4/1996 | Nagahama | 84/609 |
| 5,739,759 A | * | 4/1998 | Nakazawa et al. | 340/7.62 |
| 5,854,826 A | * | 12/1998 | Kim | 379/68 |
| 6,075,998 A | * | 6/2000 | Morishima | 455/567 |
| 6,094,587 A | * | 7/2000 | Armanto et al. | 455/567 |
| 6,337,972 B1 | * | 1/2002 | Jones et al. | 340/7.57 |
| 6,353,167 B1 | * | 3/2002 | Tuttle | 84/477 R |
| 6,449,496 B1 | * | 9/2002 | Beith et al. | 455/563 |
| 6,501,967 B1 | * | 12/2002 | Makela et al. | 455/567 |
| 2001/0024965 A1 | * | 9/2001 | Hayashi | 455/567 |
| 2001/0027102 A1 | * | 10/2001 | Okazaki et al. | 455/435 |

FOREIGN PATENT DOCUMENTS

| | | |
|---|---|---|
| EP | 0684591 A1 * | 11/1995 |
| EP | A1 0 795 845 | 9/1997 |
| EP | A2 0 933 917 | 8/1999 |
| JP | A2 11-88211 | 3/1999 |
| JP | A1 11-220518 | 8/1999 |
| WO | WO 92/03891 * | 3/1992 |
| WO | A3 00/46976 | 8/2000 |

* cited by examiner

Primary Examiner—Scott L. Weaver
(74) Attorney, Agent, or Firm—Foley & Lardner (57) ABSTRACT

The pitch name of one musical note in a desired incoming call reporting melody is input through a voice (step S2). The input voiced pitch name information is subjected to speech recognition, and pitch name data, which matches data representing the input pitch name, is selected from a plurality of previously cataloged pitch name data (step S3) Next, the pitch name based on the selected one pitch name data is displayed as a character on a display screen, and the note duration of the pitch name is keyed (steps S4 and S5). A musical note corresponding to the musical note data thus obtained is displayed on a musical staff on the screen (step S6). One score data comprising a plurality of musical note data prepared in the same manner as described above is stored in a storage unit (step S8). At the time of inputting a chord, in the step S2, the pitch names of a plurality of respective musical notes constituting one chord are successively input through a voice. By virtue of the above constitution, a portable telephone set can be realized which enables an incoming call reporting melody to be accurately input in a short time.

11 Claims, 4 Drawing Sheets

PORTABLE TELEPHONE SET AND METHOD FOR INPUTTING SAID INCOMING CALL REPORTING MELODY

FIELD OF THE INVENTION

The invention relates to a portable telephone set(a cellular phone), and a method for inputting an incoming call reporting melody, and more particularly to a portable telephone set which can inform the user of the portable telephone set of an incoming call through a melody tone, and a method for inputting the incoming call reporting melody.

BACKGROUND OF THE INVENTION

In conventional portable telephone sets which report an incoming call through a melody tone, when the input of a favorite melody by the user himself or herself is contemplated, it is a common practice to key all information such as scales and note durations. In these conventional portable telephone sets, however, a very large number of key entry operations are necessary, and, thus, enormous time is required for completing the input of all melodies.

In order to overcome this problem, a portable telephone set has been proposed wherein a melody tone is prepared by inputting a voice through a microphone without keying (Japanese Patent Laid-Open No. 88211/1999). In this conventional portable telephone set, a singing voice of a humming person through a microphone is sampled by an A/D converter, and the sampled data is stored in a memory. Upon an incoming call, a CPU reads the data stored in the memory, and an original melody call tone is produced by a musical scale tone source signal generator. This call tone is sounded through a speaker.

Further, a proposal has been made on another portable telephone set which enables a desired scale to be input without key entry (Japanese Patent Laid-Open No. 220518/1999). According to this conventional portable telephone set, the user of the portable telephone set hums a melody toward a microphone, and the melody vocalized by the user is converted to a voice signal through the microphone which is then converted to a digital signal. The digital signal is then input into a computing section, where arithmetic means extracts a frequency component equivalent to a scale from the digital signal to obtain scale information. A scale signal is then produced based on the extracted scale information, and a voice output device is driven by this scale signal.

In both the above-described conventional portable telephone sets, the time necessary for the input of a melody tone to be completed can be shortened because the scale is not input by key entry. In these portable telephone sets, however, since the user performs voice input of a melody through a microphone, the melody tone output varies depending upon a sense of pitch and vocalization of individual users. This leads to a possibility that, for some users, a melody having a different scale is output despite the fact that the original melody is identical. This poses a problem that an incoming call reporting melody cannot be accurately input.

An additional problem involved in the conventional portable telephone sets is that, due to the input of a melody which has been hummed toward a microphone by the user, it is impossible to input an incoming call reporting melody containing chords.

SUMMARY OF THE INVENTION

Under the above circumstances, the invention has been made, and it is an object of the invention to provide a portable telephone set which enables an incoming call reporting melody to be accurately input in a short time, and to provide a method for inputting the incoming call reporting melody.

It is another object of the invention to provide a portable telephone set which can input an incoming call reporting melody containing a chord, and to provide a method for inputting the incoming call reporting melody.

According to the first feature of the invention, a portable telephone set comprises:

voice input means for inputting, through a voice, pitch names of an incoming call reporting melody in the order of musical notes;

speech recognition means which, every time when pitch name information is input through a voice by the voice input means, compares data representing the pitch name, produced from the voiced pitch name information, with previously cataloged pitch name data to find out pitch name data which matches the data representing the pitch name, thereby performing speech recognition;

a display unit for displaying a musical staff, a pitch name, and a musical note;

display control means for displaying as a character the pitch name based on the pitch name data selected by the speech recognition means, on a screen of the display unit with the musical staff displayed thereon;

key entry means which, every time when the character corresponding to the pitch name is newly displayed on the display unit, permits the keying of the note duration of the pitch name displayed as the character together with the musical staff on the display unit;

musical note data production means which produces musical note data based on the note duration data keyed by the key entry means and the pitch name corresponding to the note duration and, in addition, displays on the musical staff a musical note corresponding to the musical note data;

storage unit for storing score data of the incoming call reporting melody, said score data comprising a plurality of musical note data which have been successively produced by the musical note data production means; and incoming melody sounding means which, upon call incoming, converts the score data stored in the storage unit to a melody waveform signal which is then sounded through a speaker.

According to the invention, out of pitch names and durations of musical notes constituting a desired call coming reporting melody to be input, the pitch names are input through a voice to provide pitch name data with an accurate tone height through speech recognition, while, regarding note duration, data representing accurate note duration is input by key entry means. One musical note data is then produced from the pitch name data and the note duration input by the key entry means. Therefore, as compared with the conventional portable telephone sets wherein all the pitch names and the note durations are keyed, the number of key operations can be reduced. Further, as compared with the conventional portable telephone sets wherein the whole incoming call reporting melody tone is input through a voice, musical note data having more accurate pitch name and note duration can be provided.

In the portable telephone set according to the first feature of the invention, at the time of inputting a chord, a construction may be adoption wherein the voice input means permits the plurality of pitch names of a plurality of respective musical notes constituting the chord to be successively input trough a voice, the display control means successively displays, on the display unit, a plurality of pitch names as characters based on a plurality of successive pitch name data selected by the voice recognition means, together with the musical staff, the key entry means, when the pitch names as the characters have been successively displayed together with the musical staff on the display unit, permits the note durations of the respective pitch names to be successively keyed, and the musical note data production means produces musical note data on one chord based on the plurality of note durations input successively by the key entry means and the plurality of pitch names corresponding respectively to the note durations.

According to this construction, the pitch names of a plurality of respective musical notes are successively input through a voice, and, when the plurality of pitch names are successively displayed as characters together with a musical staff on the display unit, note durations corresponding respectively to the pitch names are successively keyed to produce musical note data for one chord comprising a plurality of musical notes. By virtue of this construction, as compared with the conventional portable telephone sets wherein all the pitch names and the note durations are keyed, the number of key entry operations can be reduced. Further, as compared with the conventional portable telephone sets wherein the whole incoming call reporting melody tone is input through a voice, musical note data for one chord, having more accurate pitch name and note duration can be provided.

In the portable telephone set according to the first feature of the invention, preferably, the key entry means assigns a part of various keys, constituting a key entry section for use in at least dialing at the time of calling, respectively to a plurality of signs indicating note durations expressed on the musical staff, and permits desired note duration to be input through a key assigned to the sign of the desired note duration. This can eliminate the need to provide a specialty key entry section for an incoming call reporting melody, and thus can prevent the necessity of increasing the size of the portable telephone set.

According to the second feature of the invention, a method for inputting an incoming call reporting melody adapted for reporting call incoming in a portable telephone set, said method comprises:

the first step of inputting, through a voice, the pitch name of one musical note in a desired incoming call reporting melody;

the second step of performing speech recognition of the input voiced pitch name information and selecting one pitch name data, which matches data representing the input pitch name, from a plurality of previously cataloged pitch name data;

the third step of displaying on a display screen the pitch name as a character based on the one pitch name data selected in the second step;

the fourth step of keying the note duration of the pitch name displayed as the character;

the fifth step of producing one musical note data comprising the note duration keyed in the fourth step and the pitch name displayed as the character, storing the musical note data, and, in addition, displaying a musical note corresponding to the musical note data on a musical staff displayed on the screen; and the sixth step of repeating the first to fifth steps for all the musical notes constituting the desired incoming call reporting melody to produce a plurality of musical note data, which constitute one score data, and storing the score data in the storage unit.

In the method according to the second feature of the invention, out of pitch names and durations of musical notes constituting a desired incoming call reporting melody to be input, the pitch names are input through a voice to provide pitch name data with an accurate tone height through speech recognition, while, regarding note duration, data representing accurate note duration is input by key entry means in the fourth step. One musical note data is then produced from the pitch name data and the note duration input by the key entry means. Therefore, as compared with the conventional portable telephone sets wherein all the pitch names and the note durations are keyed, the number of key operations can be reduced. Further, as compared with the conventional portable telephone sets wherein the whole incoming call reporting melody tone is input through a voice, musical note data having more accurate pitch name and note duration can be provided.

In the method according to the second feature of the invention, preferably, at the time of inputting a chord, in the first step, the pitch names of a plurality of respective musical notes constituting one chord are successively input through a voice, in the third step, the pitch names based on a plurality of respective pitch name data selected by the second step are successively displayed as characters on the screen, in the fourth step, a plurality of note durations of the plurality of respective pitch names successively displayed as the characters are successively keyed, in the fifth step, one chord data is produced from a plurality of musical note data comprising the plurality of note durations keyed in the fourth step and the plurality of pitch names displayed as the characters on the screen and is then stored, and, in addition, musical notes corresponding respectively to the chord data are displayed on the musical staff on the screen.

According to this construction, the pitch names of a plurality of musical notes are successively input through a voice, and, when a plurality of pitch names are successively displayed as characters together with a musical staff on the display unit, note durations corresponding respectively to the pitch names are successively keyed to produce musical note data for one chord comprising a plurality of musical notes. By virtue of this construction, as compared with the conventional portable telephone sets wherein all the pitch names and the note durations are keyed, the number of key entry operations can be reduced. Further, as compared with the conventional portable telephone sets wherein the whole incoming call reporting melody tone is input through a voice, musical note data for one chord, having more accurate pitch name and note duration can be provided.

In the method according to the second feature of the invention, preferably, when an identical pitch name has been successively input through a voice a plurality of times in the first step, in the second step, the speech recognition of the pitch name is performed and, in addition, the height of the tone is determined based on the number of successions of the identical pitch name, followed by the selection of pitch name data having a tone height, which matches the input pitch name, from a plurality of previously cataloged pitch name data. This can realize accurate speech recognition of pitch names which are identical to each other in the name of pitch but are different from each other in tone height by an octave.

BRIEF DESCRIPTION OF THE DRAWINGS

The invention will be explained in more detail in conjunction with the appended drawings, wherein.

DESCRIPTION OF THE PREFERRED EMBODIMENTS

Figure 1:
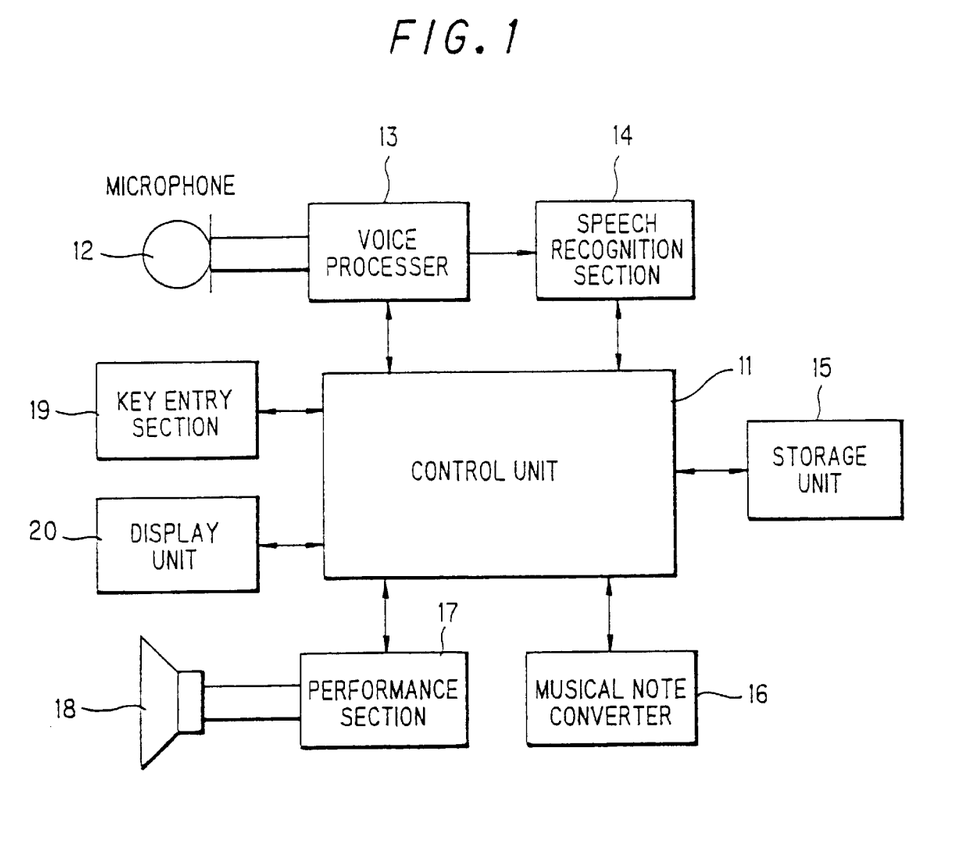
FIG. 1 is a block diagram showing a preferred embodiment of the portable telephone set according to the invention.

Preferred embodiments of the invention will be described in conjunction with the accompanying drawings. FIG. 1 is a block diagram showing a preferred embodiment of the portable telephone set according to the invention. In this drawing, the portable telephone set comprises: a control unit 11; a microphone 12 for picking up a voice of the user of the portable telephone set; a voice processor 13 for converting an electric signal (a voice signal) input through the microphone 12 to a digital signal; a speech recognition section 14 which, based on the voice data converted to the digital signal in the voice processor 13, selects voice data, which matches the input voice, from previously cataloged voice data, and inputs the result of the selection into the control unit 11; a storage unit 15 which stores data obtained in the control unit 11 and outputs the stored data to the control unit 11; a musical note converter 16; a performance section 17; a speaker 18 for sounding a voice of a melody waveform sent from the performance section 17, that is, a melody tone; a key entry section 19; and a display unit 20.

The control unit 11 comprehensively controls the whole portable telephone set, and, if necessary, accesses the storage unit 15 to read data therefrom or write data thereinto. The musical note converter 16 performs a conversion using the voice data determined in the speech recognition section 14 and the signal input by the key entry section 19 to a musical note data on a musical staff. The performance section 17 feeds a melody waveform according to already cataloged score data into the speaker 18. The key entry section 19 comprises various keys for use in at least dialing at the time of calling in the portable telephone set. According to this preferred embodiment, a part of these various keys are previously assigned respectively to a plurality of signs indicating note durations expressed on the musical staff, and the key entry section 19 transmits a key entry signal, corresponding to a key depressed by the user, to the control unit 11. The display unit 20 displays contents directed by the control unit 11 on a screen.

It is a matter of course that the portable telephone set has a circuit inherent in a portable telephone set, for performing radio communication between the portable telephone set and base stations, although this circuit is not shown in FIG. 1. Further, the speaker 18 can also be constructed so that a voice of a caller transmitted from the terminal of the caller can be sounded.

Figure 2:
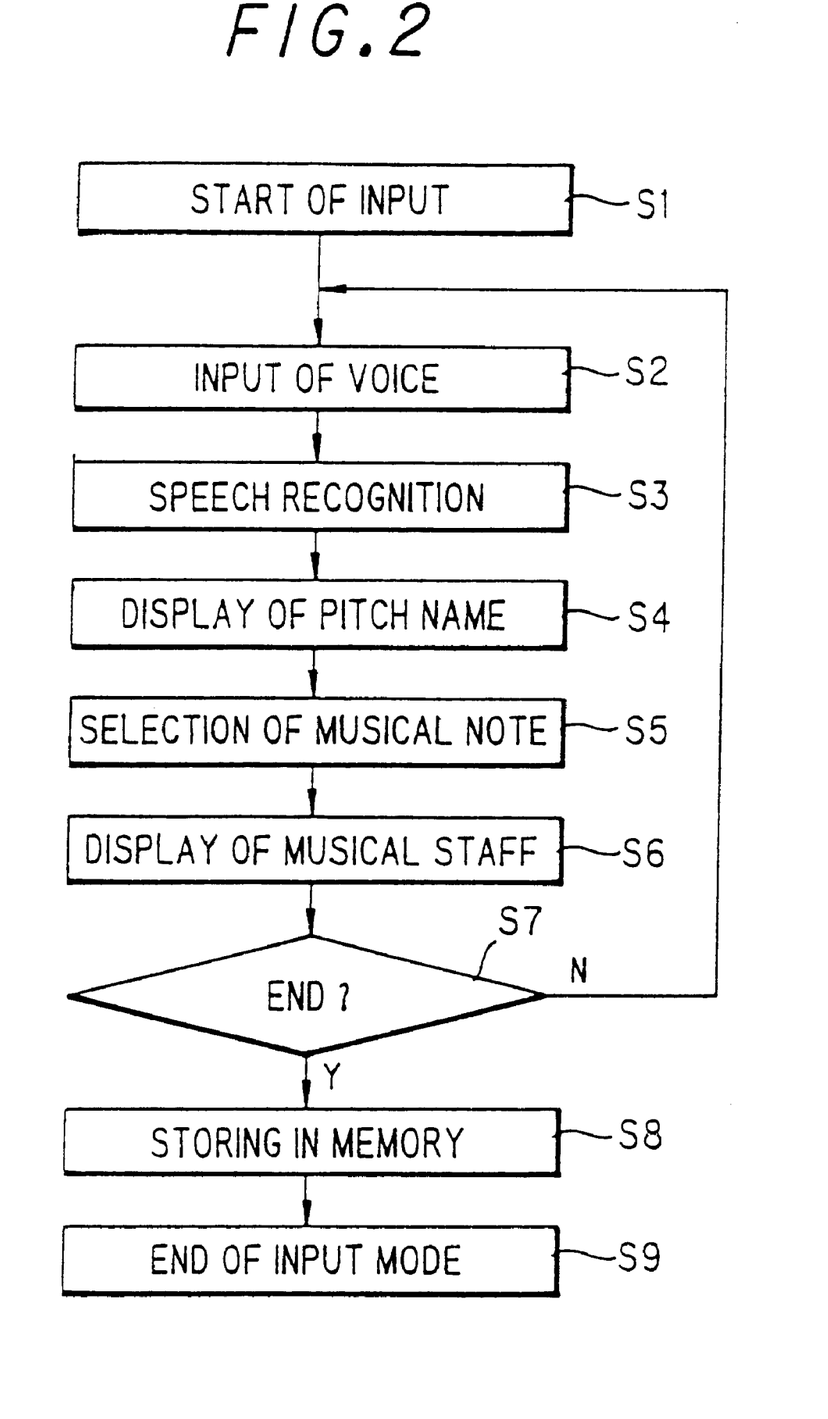
FIG. 2 is a flow chart illustrating the operation of a preferred embodiment of the method for inputting an incoming call reporting melody according to the invention.

Next, the operation of this preferred embodiment, that is, the method for inputting an incoming call reporting melody, will be explained in conjunction with FIG. 2 (a flow chart) and FIG. 3 (an explanatory view). The start is in the stand-by state for the input of a voice through the microphone 12 (step S1). In this state, when the user utters a vocal sound representing a pitch name toward the microphone 12, for example, when the user utters a vocal sound of "ド (do)" as indicated by 101 in FIG. 3C, this vocal sound representing a pitch name is subjected to sound-to-electricity conversion by means of the microphone 12 to form a voice signal. The voice signal is brought to voice data in a digital signal formed by the voice processor 13, and the digital signal is then input into the speech recognition section 14 (step S2).

The speech recognition section 13 performs speech recognition of the input voice data to provide data representing the pitch name, and finds out data, which matches this data, from previously cataloged pitch name data. When the matched data has been found out, the speech recognition section 13 informs the control unit 11 of the pitch name data (a character of the pitch name) (step S3). The control unit 11 converts the pitch name data sent from the speech recognition section 13 to display data which is then displayed on the screen in the display unit 20 (step S4). Therefore, in this case, as indicated by 201 in FIG. 3D, the character "ド (do)" representing the pitch name is displayed on the screen in the display unit 20.

Figure 3A:
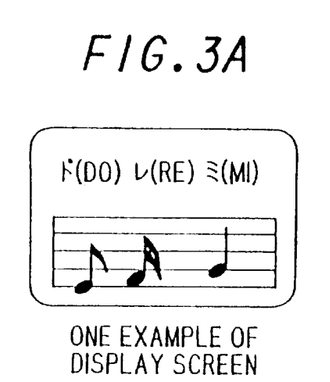
FIGS. 3A–3D are diagrams illustrating a display screen, a key assignment, input, and display in a preferred embodiment of the method according to the invention.
Figure 3B:
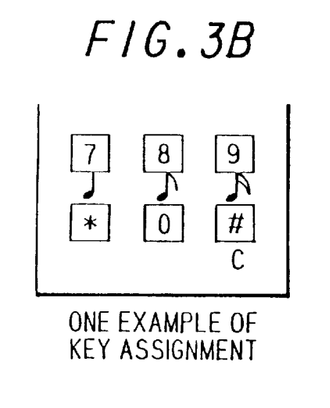

Next, the portable telephone set is brought to the state of a wait for the designation of the note duration of the input pitch name "ド (do)," that is, the state of a wait for keying. Here as shown in FIG. 3B, it is assumed that, among various keys in the key entry section 19, a numeric key "7" (hereinafter referred to as "key 7") is assigned to a quarter note (a crotchet), a numeric key "8" (hereinafter referred to as "key 8") to an eighth note (a quaver), a numeric key "9" (hereinafter referred to as "key 9") to a sixteenth note, "key *" to a rest, a numeric key "0" (hereinafter referred to as "key 0") to a dot, and "key #" to a clear (a clear of a musical note).

In the state of a wait for keying, for example, when the user wishes to designate an eighth note, the "key 8" in the key entry section 19 is depressed to select the musical note (step S5). As a result, the control unit 11 produces image data for displaying an eighth note on the position of "ド (do)" in the musical staff on the screen in the display unit 20 as indicated by 202 in FIGS. 3A and 3D, and sends this image data to the display unit 20 (step S6). This completes the input of the first sound.

At the time of the display of the musical note on the musical staff in the step S6, the musical note converter 16 produces musical note data on the first sound based on the data input from the key entry section 19 through the control unit 11 (in this example, data of "key 8") and the pitch name data sent from the speech recognition section 14 through the control unit 11 (in this example, data of "ド (do)," and this data is temporarily stored in the internal storage unit or the storage unit within the control unit 11.

Subsequently, the state is brought to the state of a wait for selection input wherein whether or not the input of the melody tone is ended is displayed on the screen (step S7). When the user wishes to continue the input of the melody tone, the operation of the steps S2 to S6 is repeated. For example, when the user then utters a vocal sound of "レ (re)" toward the microphone 12, as indicated by 103 in FIG. 3C, the control unit 11 converts the pitch name data of "レ (re)" sent from the speech recognition section 13 to display data which is then displayed on the screen in the display unit 20 (steps S2 to S4). Therefore, in this case, as indicated by 203 in FIG. 3D, a character "レ (re)" is displayed on the screen in the display unit 20.

Next, in the portable telephone set, as indicated by 104 and 105 in FIG. 3C, when the user successively depresses "key 9" and "key 0" as the note duration of the input pitch name "レ (re)," the control unit 11 displays, on the screen in the display unit 20, a dot sixteenth note of the pitch name "レ (re)" on the musical staff in its position below the character "レ (re)," as indicated by 204 and 205 in FIGS. 3A and 3D (steps S5 and S6). Further, at that time, musical note data on the dot sixteenth note of the pitch name "レ (re)" as the second sound is produced by the musical note converter 16, and is temporarily stored.

Figures 3C, 3D:
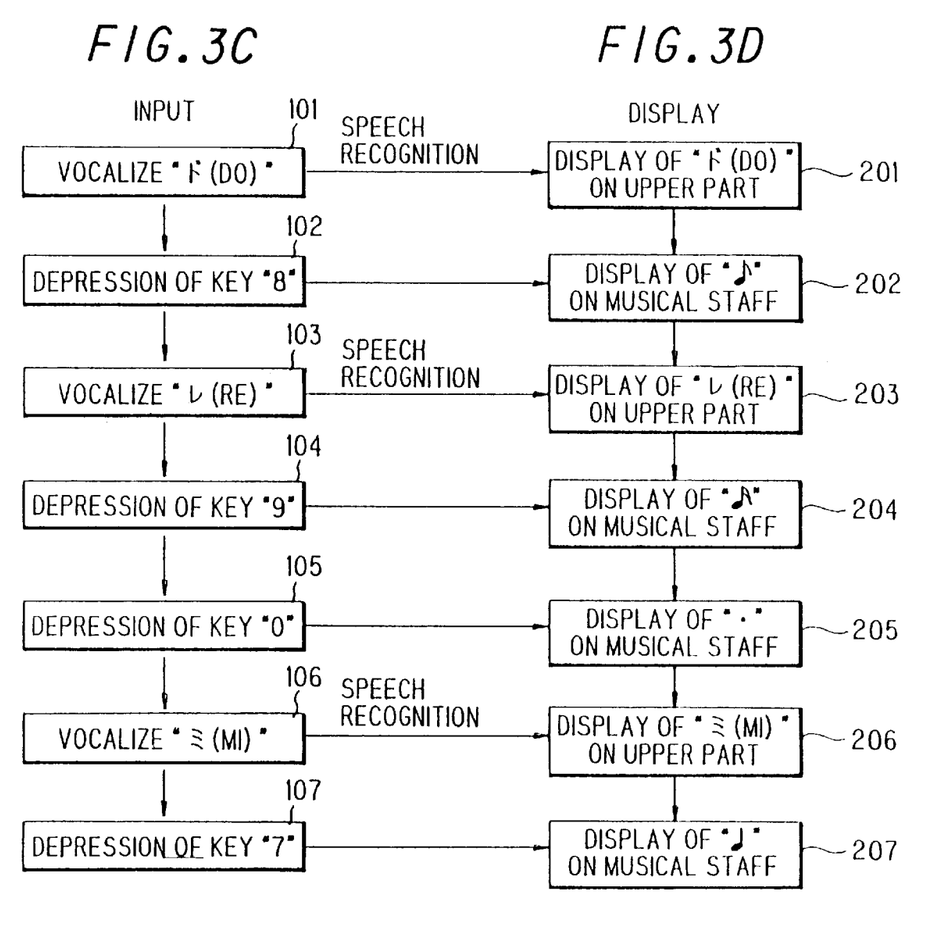

Successively, when the user then utters a vocal sound of "ミ (mi)" toward the microphone 12 as indicated by 106 in FIG. 3C, the control unit 11 converts the musical note data on "ミ (mi)" sent from the speech recognition section 13 to display data which is then displayed on the screen in the display unit 20 (steps S2 to S4). Therefore, in this case, as indicated by 206 in FIG. 3D, the character "ミ (mi)" is displayed on the screen in the display unit 20.

Next, in the portable telephone set, when the user depresses "key 7" as the note duration of the input pitch name "ミ (mi)," as indicated by 107 in FIG. 3C, the control unit 11 displays, on the screen in the display unit 20, a quarter note of the pitch name "ミ (mi)" on the musical staff in its position below the character "ミ (mi)," as indicated by 207 in FIGS. 3A and 3D (steps S5 and S6). Further, at that time, musical note data on the third sound is produced by the musical note converter 16, and is temporarily stored.

Thereafter, the above operation is repeated, and, when the input of all the melody tones has been completed, upon the depression of the end button in the key entry section 19, the control unit 11 judges that the input of the melody tones has been completed. In this case, the control unit 11 stores, as score data of the incoming call reporting melody, in the storage unit 15, a plurality of musical note data produced by the musical note converter 16 based on the plurality of pitch name data sent from the speech recognition section and the keyed data (step S8), and this ends the input mode of the incoming call reporting melody (step S9).

Thus, according to this preferred embodiment, the pitch name in the incoming call reporting melody is input through the user's voice, while the note duration of the pitch name is keyed. By virtue of this, as compared with the conventional portable telephone sets wherein all the pitch names and the note durations in the incoming call reporting melody are keyed, the number of key operations can be reduced and, thus, the incoming call reporting melody can be input in a short time. Further, as compared with the conventional portable telephone sets wherein the whole incoming call reporting melody is input through a microphone, the incoming call reporting melody can be more accurately input independently of the sense of pitch and vocalization of individual users.

In response to an incoming call in the portable telephone set, in response to an incoming call reporting signal, the control unit 11 shown in FIG. 1 reads the score data stored in the storage unit 15, and sends the score data to the performance section 17. In the performance section 17, the score data is converted to a voice signal of a melody waveform, corresponding to the score data, which is then vocalized as a melody tone through the speaker 18.

Figure 4A:
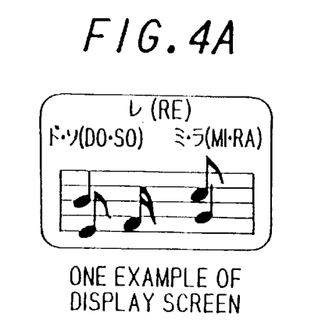
FIGS. 4A–4D are diagrams illustrating a display screen, a key assignment, input, and display in another preferred embodiment of the method according to the invention.
Figure 4B:
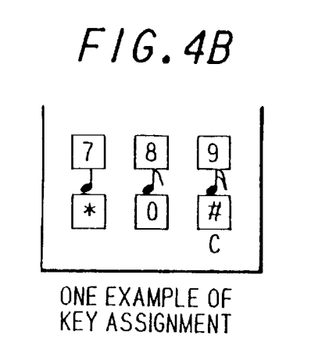

Next, another preferred embodiment of the invention will be described. FIG. 4 is a diagram illustrating another preferred embodiment of the method for inputting an incoming call reporting melody according to the invention. The construction of a portable telephone set in this preferred embodiment is the same as the construction shown in FIG. 1 (block diagram). Further, as shown in FIG. 4B, the key assignment in the key entry section 19 is the same as that shown in FIG. 3B. This preferred embodiment, however, is characterized in that a chord can be input as an incoming call reporting melody.

Figure 4C:
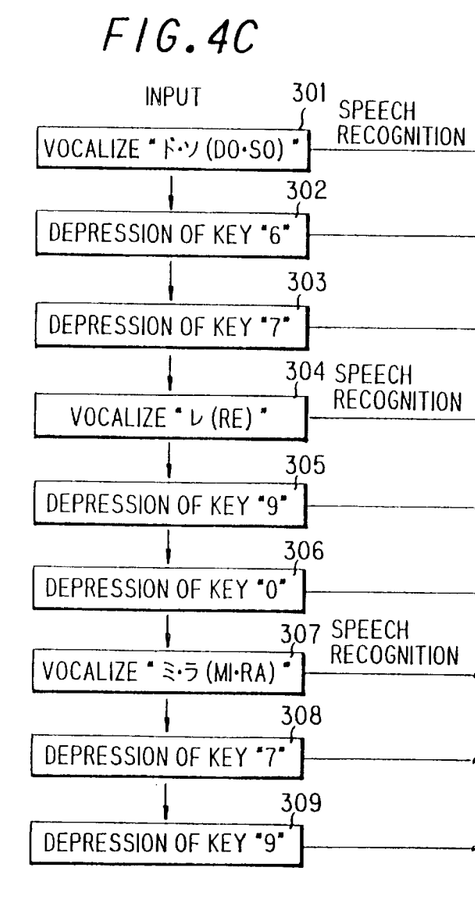

More specifically, the user utters a vocal sound of desired pitch names "ド・ソ (do.so)" toward the microphone 12 as indicated by 301 in FIG. 4C. Upon successful speech recognition, as indicated by 401 in FIG. 4D, characters "ド・ソ (do.so)" are displayed on a portion above the musical staff on the screen in the display unit 20. Subsequently, when the user successively depresses "key 8" and "key 7" in the key entry section 19, as indicated by 302 and 303 in FIG. 4C, an eighth note attributed to the depression of "key 8" is displayed on the musical staff, on the screen in the display unit 20, in its position corresponding to the "ド(do)" which has been first input through a voice, while a quarter note attributed to the depression of "key 7" is displayed on the musical staff, on the screen in the display unit 20, in its position corresponding to the "ソ(so)" which has been next input through a voice, as indicated by 402 and 403 in FIGS. 4A and 4D.

Next, the user utters a vocal sound of "レ(re)" toward the microphone 12 as indicated by 304 in FIG. 4C. Upon successful speech recognition, as indicated by 404 in FIG. 4D, a character "レ(re)" is displayed on a portion above the musical staff on the screen in the display unit 20. Subsequently, when the user successively depresses "key 9" and "key 0" in the key entry section 19, as indicated by 305 and 306 in FIG. 4C, a dot sixteenth note is displayed on the musical staff, on the screen in the display unit 20, in its position corresponding to the "レ (re)" as indicated by 405 and 406 in FIGS. 4A and 4D.

Subsequently, the user utters a vocal sound of "ミ・ラ (mi.ra)" toward the microphone 12 as indicated by 307 in FIG. 4C. Upon successful speech recognition, as indicated by 407 in FIG. 4D, characters "ミ・ラ(mi.ra)" are displayed on a portion above the musical staff and adjacent to the character "レ(re)" on the screen in the display unit 20.

Figure 4D:
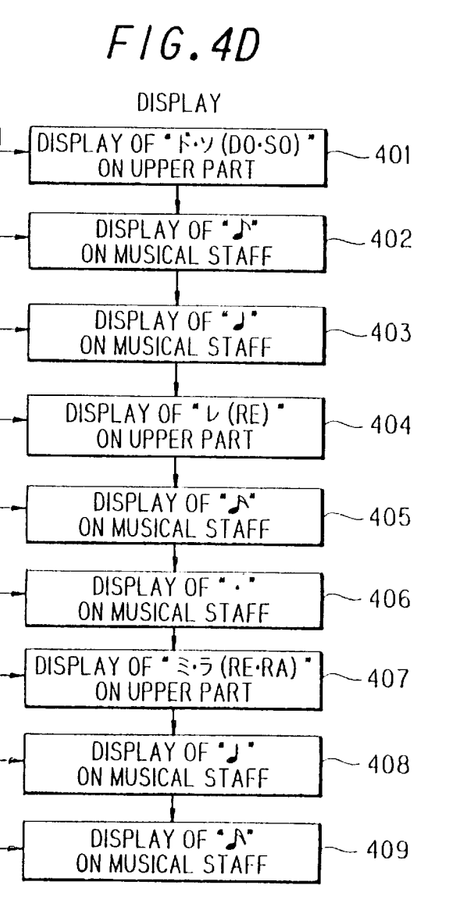

Subsequently, when the user successively depresses "key 7" and "key 9" in the key entry section 19, as indicated by 308 and 309 in FIG. 4C, a quarter note attributed to the depression of "key 7" is displayed on the musical staff, on the screen in the display unit 20, in its position corresponding to the "ミ (mi)" which has been first input through a voice, while a sixteenth note attributed to the depression of "key 9" is displayed on the musical staff, on the screen in the display unit 20, in its position corresponding to the "ラ(ra)" which has been next input through a voice, as indicated by 408 and 409 in FIGS. 4A and 4D. Thereafter, the above operation is repeated until the whole incoming call reporting melody is input.

Thus, according to this preferred embodiment, successively uttering two or more pitch names permits musical notes of two or more pitch names to be input into the musical staff in its same portion. Therefore, the input of a chord-containing incoming call reporting melody, which is currently constituting the mainstream of incoming call reporting melodies, can be achieved with an accurate scale in a relatively short time. Also in this preferred embodiment, musical note data is produced in the musical note converter 16, and, upon the completion of the input of the incoming call reporting melody, score data composed of a plurality of musical note data prepared in time series is recorded in the storage unit 15.

It should be noted that the invention is not limited to the above preferred embodiments. For example, the input of one musical note, which is identical to another musical note in the pitch name but is different from the another musical note in tone height by an octave, can be distinguished from the input of the another musical note through a difference in the number of successions of the vocalized identical pitch name between these two musical notes.

As described above, according to the invention, out of pitch names and durations of musical notes constituting a desired incoming call reporting melody to be input, the pitch names are input through a voice to provide pitch name data with an accurate tone height through speech recognition, while, regarding note duration, data representing accurate note duration is input by key entry means. One musical note data is then produced from the pitch name data and the note duration input by the key entry means. Therefore, as compared with the conventional portable telephone sets wherein all the pitch names and the note durations are keyed, the number of key operations can be reduced. This can shorten the input time of the incoming call reporting melody, and, in addition, can simplify the input work.

Further, according to the invention, data representing an accurate note duration is provided by keying, and, together with the above pitch name data, constitutes one musical note data. By virtue of this, as compared with the conventional portable telephone sets wherein the whole incoming call reporting melody tone is input through a voice, musical note data having more accurate pitch name and note duration can be provided and, thus, a more accurate incoming call reporting melody tone can be realized.

Further, according to the invention, at the time of inputting a chord, the pitch names of a plurality of musical notes are successively input through a voice, and, when a plurality of pitch names are successively displayed as characters together with a musical staff on the display unit, note durations corresponding respectively to the pitch names are successively keyed to produce musical note data for one chord comprising a plurality of musical notes. By virtue of this construction, the provision of musical note data of a chore can be realized which has been difficult in the conventional portable telephone sets wherein the whole incoming call reporting melody tone is input through a voice. Therefore, an incoming call reporting melody containing chords can be simply input.

The invention has been described in detail with particular reference to preferred embodiments, but it will be understood that variations and modifications can be effected within the scope of the invention as set forth in the appended claims.

What is claimed is:

1. A portable telephone set comprising:
   voice input means for inputting, through a voice, pitch names of an incoming call reporting melody in the order of musical notes;
   speech recognition means which, every time when pitch name information is input through a voice by the voice input means, compares data representing the pitch name, produced from the voiced pitch name information, with previously cataloged pitch name data to find out pitch name data which matches the data representing the pitch name, thereby performing speech recognition;
   a display unit for displaying a musical staff, a pitch name, and a musical note;
   display control means for displaying as a character the pitch name based on the pitch name data selected by the speech recognition means, on a screen of the display unit with the musical staff displayed thereon;
   key entry means which, every time when the character corresponding to the pitch name is newly displayed on the display unit, permits the keying of the note duration of the pitch name displayed as the character together with the musical staff on the display unit;
   musical note data production means which produces musical note data based on the note duration data keyed by the key entry means and the pitch name corresponding to the note duration and, in addition, displays on the musical staff a musical note corresponding to the musical note data;
   a storage unit for storing score data of the incoming call reporting melody, the score data comprising a plurality of musical note data which have been successfully produced by the musical note data production means; and
   incoming melody sounding means which, in response to an incoming call, converts the score data stored in the storage unit to a melody waveform signal which is then sounded through a speaker.

2. The portable telephone set according to claim 1, wherein, at a time of inputting a chord to the portable telephone set,
   the voice input means permits a plurality of pitch names of a plurality of respective musical notes constituting the chord to be successively input through a voice,
   the display control means successively displays, on the display unit, a plurality of pitch names as characters based on a plurality of successive pitch name data selected by the speech recognition means, together with the musical staff,
   the key entry means, when the pitch names as the characters have been successively displayed together with the musical staff on the display unit, permits the note durations of the respective pitch names to be successively keyed, and
   the musical note data production means produces musical note data on one chord based on the plurality of node durations input successively by the key entry means and the plurality of pitch names corresponding respectively to the note durations.

3. The portable telephone set according to claim 1, wherein the key entry means assigns a part of various keys, constituting a key entry section for use in at least dialing at the time of calling, respectively to a plurality of signs indicating note durations expressed on the musical staff, and permits desired note duration to be input through a key assigned to the sign of the desired note duration.

4. A method for inputting an incoming call reporting melody adapted for reporting an incoming call in a portable telephone set, said method comprising:
   a first step of inputting, through a voice, the pitch name of one musical note in a desired incoming call reporting melody;
   a second step of performing speech recognition of the input voiced pitch name information and selecting one pitch name data, which matches data representing the input pitch name, from a plurality of previously cataloged pitch name data;

a third step of displaying on a display screen the pitch name as a character based on the one pitch name data selected in the second step;

a fourth step of keying the note duration of the pitch name displayed as the character;

a fifth step of producing one musical note data comprising the note duration keyed in the fourth step and the pitch name displayed as the character, storing the musical note data, and, in addition, displaying a musical note corresponding to the musical note data on a musical staff displayed on the display screen; and a sixth step of repeating the first to fifth steps for all the musical notes constituting the desired incoming call reporting melody to produce a plurality of musical note data, which constitutes one score data, and storing the score data in a storage unit.

5. The method according to claim 4, wherein, at a time of inputting a chord to the portable telephone set, in the first step, pitch names of a plurality of respective musical notes constituting one chord are successively input through a voice, in the third step, the pitch names based on a plurality of respective pitch name data selected by the second step are successively displayed as characters on the display screen, in the fourth step, a plurality of note durations of the plurality of respective pitch names successively displayed as the characters are successively keyed, in the fifth step, one chord data is produced from a plurality of musical note data comprising the plurality of note durations keyed in the fourth step and the plurality of pitch names displayed as the characters on the display screen and is then stored, and, in addition, musical notes corresponding respectively to the chord data are displayed on the musical staff on the display screen.

6. The method according to claim 4, wherein when an identical pitch name has been successively input through a voice a plurality of times in the first step, in the second step, the speech recognition of the pitch name is performed and, in addition, the height of the tone is determined based on the number of successions of the identical pitch name, followed by the selection of pitch name data having a tone height, which matches the input name, from a plurality of previously cataloged pitch name data.

7. The portable telephone set according to claim 2, wherein the key entry means assigns a part of various keys, constituting a key entry section for use in at least dialing at the time of calling, respectively to a plurality of signs indicating note durations expressed on the musical staff, and permits desired note duration to be input through a key assigned to the sign of the desired note duration.

8. The method according to claim 5, wherein when an identical pitch name has been successively input through a voice a plurality of times in the first step, in the second step, the speech recognition of the pitch name is performed and, in addition, the height of the tone is determined based on the number of successions of the identical pitch name, followed by the selection of pitch name data having a tone height, which matches the input name, from a plurality of previously cataloged pitch name data.

9. A portable telephone set comprising:

a voice input unit configured to input, through a voice, pitch names of an incoming call reporting melody in the order of musical notes;

a speech recognition unit which, every time when pitch name information is input through a voice by the voice input unit, is configured to compare data representing the pitch name, produced from the voiced pitch name information, with previously cataloged pitch name data to find out pitch name data which matches the data representing the pitch name, thereby performing speech recognition;

a display unit configured to display a musical staff, a pitch name, and a musical note;

a display control unit configured to display as a character the pitch name based on the pitch name data selected by the speech recognition unit, on a screen of the display unit with the musical staff displayed thereon;

a key entry unit which, every time when the character corresponding to the pitch name is newly displayed on the display unit, is configured to permit the keying of the note duration of the pitch name displayed as the character together with the musical staff on the display unit;

a musical note data production unit configured to produce musical note data based on the note duration data keyed by the key entry unit and the pitch name corresponding to the note duration and, in addition, displays on the musical staff a musical note corresponding to the musical note data;

a storage unit configured to score data of the incoming call reporting melody, the score data comprising a plurality of musical note data which have been successfully produced by the musical note data production means; and an incoming melody sounding unit which, in response to an incoming call, is configured to convert the score data stored in the storage unit to a melody waveform signal which is then sounded through a speaker.

10. The portable telephone set according to claim 9, wherein, at a time of inputting a chord to the portable telephone set, the voice input units permits a plurality of pitch names of a plurality of respective musical notes constituting the chord to be successively input through a voice, the display control unit successively displays, on the display unit, a plurality of pitch names as characters based on a plurality of successive pitch name data selected by the speech recognition unit, together with the musical staff, the key entry unit, when the pitch names as the characters have been successively displayed together with the musical staff on the display unit, permits the note durations of the respective pitch names to be successively keyed, and the musical note data production unit produces musical note data on one chord based on the plurality of node durations input successively by the key entry unit and the plurality of pitch names corresponding respectively to the note durations.

11. The portable telephone set according to claim 9, wherein the key entry unit assigns a part of various keys, constituting a key entry section for use in at least dialing at the time of calling, respectively to a plurality of signs indicating note durations expressed on the musical staff, and permits desired note duration to be input through a key assigned to the sign of the desired note duration.

* * * * *